United States Patent [19]
Siegmund

[11] 4,182,547
[45] Jan. 8, 1980

[54] IMAGE FOCUSING APPARATUS FOR FIBERSCOPES

[75] Inventor: Walter P. Siegmund, Woodstock, Conn.

[73] Assignee: American Optical Corporation, Southbridge, Mass.

[21] Appl. No.: 932,749

[22] Filed: Aug. 10, 1978

[51] Int. Cl.² .............................................. G02B 5/17
[52] U.S. Cl. ................................... 350/96.26; 128/4; 350/255
[58] Field of Search ............... 350/96.24, 96.25, 96.26, 350/253, 255; 128/4

[56] References Cited
U.S. PATENT DOCUMENTS

| | | | |
|---|---|---|---|
| 3,091,235 | 5/1963 | Richards | 128/6 |
| 3,913,568 | 10/1975 | Carpenter | 128/11 |

*Primary Examiner*—John K. Corbin
*Assistant Examiner*—John D. Lee
*Attorney, Agent, or Firm*—Jeremiah J. Duggan; Alan H. Spencer; Stephen A. Schneeberger

[57] ABSTRACT

The distal objective of a fiberscope is fixed to one end of a helical spring formed of a bimetallic composite adapted to extend and contract when heated and cooled, carrying the objective along its axis. Remotely controlled heating of the spring effects adjustment of the objective for image focusing purposes.

10 Claims, 4 Drawing Figures

IMAGE FOCUSING APPARATUS FOR FIBERSCOPES

BACKGROUND OF THE INVENTION

1. Field of the Invention

This invention relates to fiber optics with particular reference to the focusing of distal objectives in long fiberscopes.

2. Description of the Prior Art

In flexible fiberscopes it is often desirable to be able to focus the distal objective remotely, i.e. from the proximal end or handle. This is usually accomplished with a sliding wire in a tubular guide as shown in exemplary U.S. Pat. No. 3,091,235. In long fiberscopes or when a fiberscope is coiled or bent sharply, friction within the tubular guide causes the inner wire to stick or bind and focusing is unreliable or inactivated.

In general, the amount of movement needed is very small, e.g. in the order of a few millimeters or less, and little force is needed to move the usually small and lightweight lenses and retaining barrel. Thus, a system capable of small precise movement is appropriate and, accordingly, it is a principal object of this invention to provide such a system.

It is a further object to accomplish the foregoing without proximal-to-distal mechanical connection in the fiberscope and in a manner affording positive lens focusing response independently of length and degree of flexing of the fiberscope.

Other objects and advantages of the invention will become apparent from the following description.

SUMMARY OF THE INVENTION

This invention provides a helical spring made of a bimetallic composite which will extend and retract when heated and cooled. The bimetallic structure comprises a wire formed of two components of differing thermal expansion intimately bonded together and twisted along its axis so that the components forms a helix. This twisted wire is finally wound into a helical spring of an appropriate pitch and length. The lens barrel is attached to one end of the helical spring and the opposite end of the spring is fixedly mounted within the fiberscope adjacent the distal end of the image conducting fiber bundle.

To effect focusing of the objective, the spring is heated with electrical current applied either directly to its coils or to a heating element surrounding it. The spring can be designed to either extend or contract when heated carrying the objective along with it for focusing images upon the fiber bundle. Use of a second identical spring or continuation of the same spring on the opposite side of the lens barrel is contemplated to compensate for ambient changes in temperature.

Details of the invention will become more readily apparent from the following description when taken in conjunction with the accompanying drawings.

IN THE DRAWINGS

DESCRIPTION OF THE PREFERRED EMBODIMENTS

Figure 1:
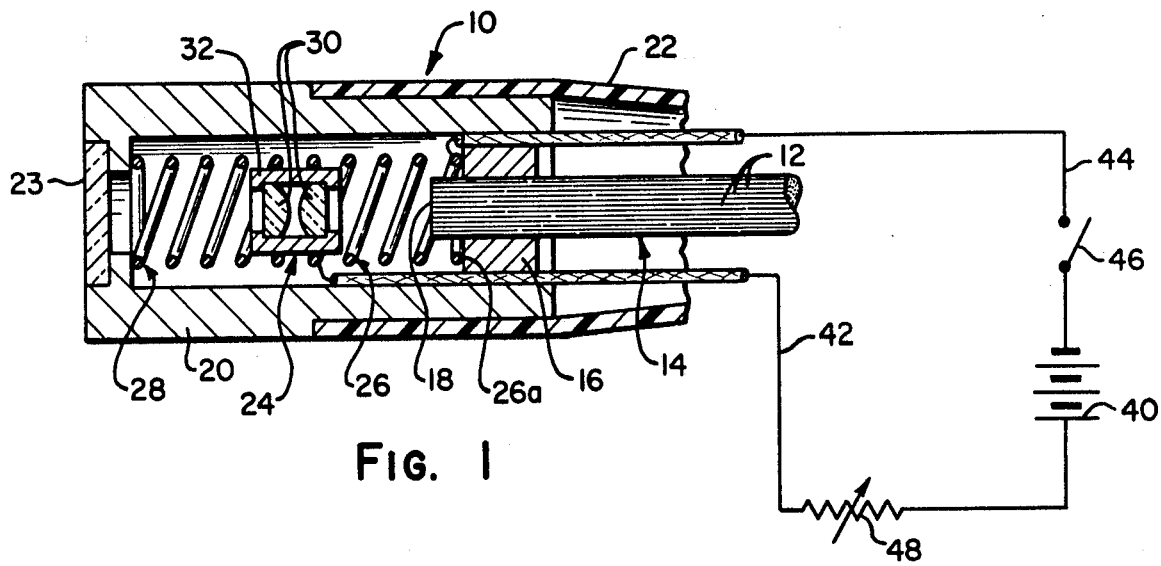
FIG. 1 is a fragmentary cross-sectional view of a fiberscope illustrating an embodiment of the invention.

Referring more particularly to FIG. 1 of the drawings, fiberscope 10 comprises the usual long and intermediately flexible bundle of juxtapositioned optical fibers 12 hereinafter referred to as bundle 14. In the present illustration, only the distal end of fiberscope 10 is shown as including a support 16 for fixing the image receiving face 18 of fiber bundle 14 in the structure. Support 16 is, in turn, carried internally of a fiberscope endpiece 20 of rigid construction to which is fitted flexible sheath 22. Sheath 22 conventionally protectively covers fiber bundle 14 and other components extending through the fiberscope. Window 23 receives image forming light to be conveyed through fiberscope 10 while optical objective 24 images this light upon face 18 of fiber bundle 14 for transmittance to the proximal end (not shown) of the fiberscope.

To the extent that fiberscope 10 has thus far been described, those desiring more detailed information concerning the structure and operation of fiberscopes, may refer to U.S. Pat. Nos. 3,091,235 and 3,913,568. The latter illustrates a fiberscope system employing a fixed focus objective while the former shows a wire operated variable focus objective system.

In providing for variable focus of objective 24 in fiberscope 10 according to the present invention, one end of objective 24 if fixed to one end of helical spring 26 and the opposite end of objective 24 is similarly fixed to helical spring 28. It will become apparent hereinafter that springs 26 and 28 may be a single unit with objective 24 mounted intermediately thereof, or spring 28 may be dispensed with if desired. In all cases, objective lenses 30 are preferably mounted within a lightweight barrel 32, e.g. of aluminum or plastic which is fitted into springs 26 and 28 to which these springs may be cemented, soldered, brazed or otherwise attached.

For purposes of maintaining alignment of objective 24 with fiber bundle face 18 at all times, end 26a of spring 26 is secured to support 16 (e.g. with solder, cement, brazing or mechanical fixturing).

Figure 3:
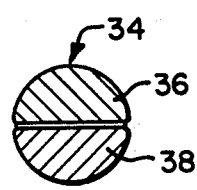
FIG. 3 is a greatly enlarged cross-sectional view of a bimetallic wire component of the image focusing system of the invention.

In order to perform the function of image focusing with objective 24, i.e. moving lenses 30 toward and away from face 18 of fiber bundle 14, helical springs 26 and 28 are made of a bimetallic composite which will extend and retract when heated and cooled. The bimetallic structure comprises a wire 34 (FIGS. 3 and 4) constructed of two components 36 and 38 of differing thermal expansion, one component 36 being lower than the other component 38. An exemplary combination of relatively high and low thermal expansion materials is stainless steel and Kovar, the latter being the well known metallic alloy of iron, nickel and cobalt having a coefficient of thermal expansion similar to glass and silicon. Components 36 and 38 are intimately bonded together by soldering, welding or swedging and are preferably, but not necessarily, each semicircular in cross-sectional configuration. An exemplary total wire diameter may be in the range of from approximately 0.010 inch to 0.030 inch.

Figure 4:
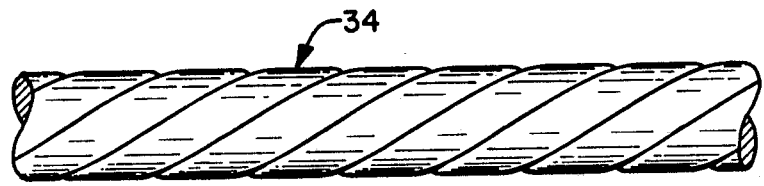
FIG. 4 is a fragmentary side view of the aforesaid wire.

Wire 34 is twisted along its axis as illustrated in FIG. 4 causing the components 36 and 38 to assume the configuration of a helix. As such, the wire will twist in torsion when heated or cooled.

The twisted wire 34 (FIG. 4) is wound into the configuration of springs 26 and 28 (FIG. 1) within which lens barrel 30 is supported and wherewith the torsional effect of heating and cooling produces longitudinal extension and retraction of the affected springs with corresponding adjustment of objective 24.

Heating spring 26 and providing the aforesaid focusing of objective 24 may be accomplished as illustrated in FIG. 1 wherein a suitable source of direct current 40 is provided. Direct current source 40 is connected in series with spring 26 by electrical lead 42 connected to one end of spring 26 and electrical lead 44 connected to the opposite end of spring 26. Switch 46 may be used to energize and deenergize the aforesaid circuit for respectively heating spring 26 and allowing it to cool. This effects longitudinal adjustment of objective 24. Variable resistance 48 may be used to adjust the current applied to spring 26 and correspondingly regulate the extent of adjustment of objective 24, i.e to the extent needed for a particular condition of focusing.

Spring 28 being of identical construction to spring 26 as mentioned hereinabove, and not connected to the aforesaid electrical heating circuit provides compensation for ambient changes in temperature. The reaction of both springs 26 and 28 to ambient temperature being identical obviates misalignment of objective 24 due to temperature changes in the environment of fiberscope 10 and more particularly in the environment of its distal end. As pointed out hereinabove, springs 26 and 28 may comprise a single continuous unit wherewith similar compensation for changes in ambient temperature may be accomplished by connecting only half or less of the helical length thereof in electrical series with the source of current 40.

Figure 2:
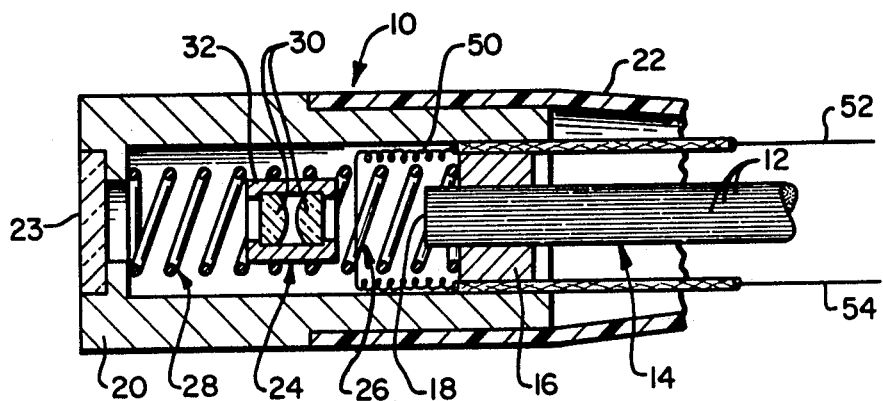
FIG. 2 is a view similar to FIG. 1 illustrating a modification of the distal image focusing system of FIG. 1.

A modification of the invention is illustrated in FIG. 2 wherein all components being similar to corresponding parts of FIG. 1 are given like reference numerals. In this embodiment of the invention, the electrical connection with spring 26 is eliminated. In its place, an electrical heating element 50 of cylindrical configuration is positioned over spring 26. Element 50 is comprised of one or more electrical resistance coils, it being understood that various other forms and configurations of heating elements may be used. Heating element 50 is energized through electrical leads 52 and 54 which are directed back through fiberscope 10 to its proximal end and connected in series circuit with a suitable source of current, variable resistance and switch, similar to those illustrated in FIG. 1.

In general, the amount of image focusing movement required in fiberscopes is very small, e.g. in the order of a few millimeters or less, and very little force is required to move the usual small, lightweight objective lens systems. Thus, the embodiments of the invention are readily capable of adequate movement and unique positive control independently of length and direction or amount of flexing of the fiberscope 10.

Those skilled in the art will readily appreciate that various modifications and adaptations of the precise forms of the invention here shown may be made to suit particular requirements. It is accordingly intended that such modifications which incorporate the novel concept disclosed are to be construed as coming within the scope of the following claims or the range of equivalency to which they are entitled in view of the prior art.

I claim:

1. In a fiberscope having a distal objective for focusing images of objects to be observed upon an image-receiving face of an image-transmitting bundle of optical fibers within the fiberscope, the improvement comprising:
    an axially adjustable helical support for said objective, said objective being secured to said support at a preselected axial distance away from one end of said support, said end of said support being fixed in said fiberscope adjacent said image-receiving face; and
    means for selectively effecting axial extension and retraction of said support for providing corresponding positional adjustment of said objective relative to said image-receiving face.

2. The improvement in a fiberscope according to claim 1 wherein said helical support comprises a spring formed of a bimetallic wire.

3. The improvement in a fiberscope according to claim 2 wherein said wire of said spring comprises the composite of longitudinally extending juxtapositioned metallic components having respectively relatively low and high coefficients of thermal expansion, said composite being twisted along its axis.

4. The improvement in a fiberscope according to claim 3 wherein said means for selectively effecting axial extension and retraction of said helical support comprises a source of electrical current.

5. The improvement in a fiberscope according to claim 4 including an electrical switch, said wire of said spring and source of current and said switch being connected in electrical series.

6. The improvement in a fiberscope according to claim 4 including an electrical heating element surrounding at least a portion of the length of said helical support and an electrical switch, said heating element and switch and source of current being connected in electrical series.

7. The improvement in a fiberscope according to claim 3 including a second spring of substantially identical construction to said first-mentioned spring, said second spring having an end thereof connected to said objective oppositely of said first-mentioned spring and further having its remaining end fixed in said fiberscope.

8. The improvement in a fiberscope according to claim 3 wherein opposite ends of said spring are fixed in said fiberscope and said objective is disposed internally of said spring intermediately of said ends thereof.

9. The improvement in a fiberscope according to claim 8 wherein said means for selectively effecting axial extension and retraction of said spring comprises a source of electrical current and includes an electrical switch, said source of current and switch being connected in electrical series with a portion of the overall length of said wire of said helical support.

10. The improvement in a fiberscope according to claim 8 further including a cylindrical electrical heating element surrounding a portion of the length of said spring and said means for selectively effecting axial extension and retraction of said helical support includes a source of electrical current and an electrical switch, said source of current and switch being connected in electrical series with said heating element.

* * * * *